United States Patent [19]

Yamura et al.

[11] Patent Number: 5,627,671

[45] Date of Patent: May 6, 1997

[54] SPECTROMETER SLIT SWITCHING MECHANISM

[75] Inventors: Hiroaki Yamura; Shigenori Hashimoto; Takeshi Kanomata; Takahiro Kadota; Shinichi Kikuchi, all of Hachioji, Japan

[73] Assignee: JASCO Corporation, Tokyo, Japan

[21] Appl. No.: 336,750

[22] Filed: Nov. 7, 1994

[30] Foreign Application Priority Data

Nov. 8, 1993 [JP] Japan .................................. 5-302346

[51] Int. Cl.$^6$ .................................................. G01J 3/04
[52] U.S. Cl. ........................... 359/232; 359/233; 356/326; 356/331; 356/334
[58] Field of Search ........................ 359/230–233, 359/235, 236; 356/328, 334, 331, 345, 346, 300, 302, 303, 305, 310

[56] References Cited

U.S. PATENT DOCUMENTS

| 3,374,705 | 3/1968 | Ott | 359/232 |
| 4,047,808 | 9/1977 | Bartlett | 359/232 |
| 4,227,811 | 10/1980 | Tohyama et al. | 356/325 |
| 4,325,634 | 4/1982 | Tohyama | 356/331 |
| 4,575,242 | 3/1986 | Akiyama et al. | 356/331 |
| 5,060,283 | 10/1991 | Shiraishi | 359/232 |

FOREIGN PATENT DOCUMENTS

57-67826 4/1982 Japan .

*Primary Examiner*—Timothy P. Callahan
*Assistant Examiner*—Kenneth B. Wells
*Attorney, Agent, or Firm*—Arthur P. Gershman

[57] ABSTRACT

A spectrometer slit switching mechanism includes a slit plate having a plurality of entrance slits and exit slits formed at prescribed positions, parallel support rods for supporting the slit plate so as to be movable along the support rods, a screw portion formed on at least one support rod for transmitting forced to the slit plate, and a driving motor for transmitting rotational energy to the support rod provided with the screw portion, wherein the entrance slits are arranged on a line that runs parallel to the direction of movement of the slit plate and the exit slits are arranged on a line that is both parallel to and spaced a prescribed distance from the line on which the entrance slits are arranged. In accordance with this structure, the driving motor is operated in the clockwise and counterclockwise directions to raise and lower the slit plate in order to align a desired entrance slit and exit slit with the light path of the spectrometer. Also, after the desired slits have been positioned and the driving motor is stopped, the slit plate is prevented from moving downwards by the engagement of the slit plate with the screw portion of the support rod, and this eliminates the need for an excitation current to be supplied to the driving motor.

13 Claims, 6 Drawing Sheets

SPECTROMETER SLIT SWITCHING MECHANISM

BACKGROUND OF THE INVENTION

1. Field of the Invention

The present invention relates to a slit switching mechanism for spectrometers.

2. Description of the Prior Art

Figure 9:
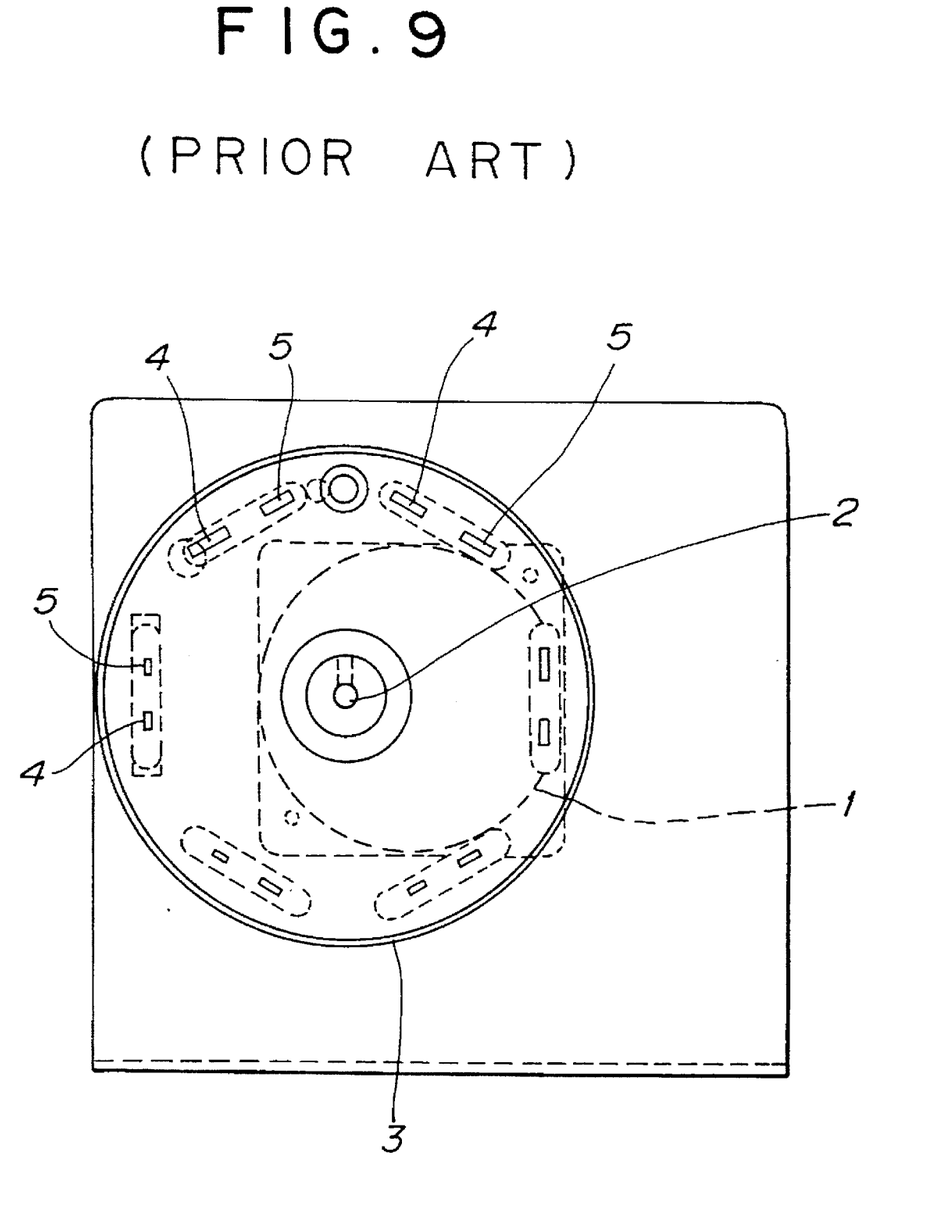
FIG. 9 is a planar view of a prior art slit switching mechanism.

An example of a prior art spectrometer slit switching mechanism for switching entrance and exit slits is described in Japanese Laid-Open Patent Publication No. Sho-57-67826. As shown in FIG. 9 of the present application, this mechanism is comprised of a circular rotation plate 3 connected to an output shaft 2 of a stepping motor 1. In this structure, the circular rotation plate 3 has pairs of equally spaced entrance slits 4 and exit slits 5 formed at a prescribed radial distance from the center of the plate 3, with each pair of slits having a slit width that is different from the other pairs of slits. And when a pair of slits 4, 5 is to be used, the stepping motor 1 is rotated through a prescribed angle to align the entrance slit 4 and the exit slit 5 with the light path of the spectrometer.

However, several problems are associated with this type of slit switching mechanism. Namely, even though it is possible to arrange the slit switching mechanism such that the light beam that passes through the slit is able to form images at the position of the slit, because the entrance slits and the exit slits are positioned on the same planar surface that is perpendicular to the output shaft 2 of the stepping motor 1, the incidence light beam and the exiting light beam must form images on that same planar surface. In other words, it is not possible to have the incidence light beam and the exiting light beam form images at different positions. As a result, only a limited arrangement of elements is possible for the spectrometer.

Furthermore, if the light beam that passes through a slit strikes the slit at an angle, it will not be possible to carry out accurate measurements, because the effective slit width will become relatively small in comparison with the actual slit width. Consequently, the light beam must strike each entrance slit and exit slit perpendicular to the slit plate. In other words, the incidence light beam and the exiting light beam must be parallel to each other, and this limits the possible arrangement of elements for the spectrometer.

Moreover, in the slit switching mechanism above, after the stepping motor 1 has been driven to rotate a desired pair of entrance and exit slits 4, 5 into alignment with the light path, the pair of slits must be maintained in that position until all measurements are completed. For this reason, a prescribed excitation current is supplied to the stepping motor 1 in order to generate a holding torque. However, it is difficult to maintain a fixed position for the pair of slits when using a small-sized stepping motor, due to the weak holding torque of small-sized stepping motors. As a result, it becomes necessary to utilize large-scale stepping motors, which in turn necessitates increased dimensions for the spectrometer. Furthermore, since the excitation current must be continually supplied to the stepping motor while the rotation plate 3 is being held at a prescribed rotation angle position, the generation of heat occurs. Besides necessitating the provision of a certain amount of space to dissipate heat, such heat generation makes it impossible to arrange heat-sensitive specimens, light detecting elements and the like in the vicinity of the stepping motor 1. Consequently, the elements of the spectrometer cannot be arranged in a reduced space, and this further increases the difficulty of designing small-sized spectrometers.

SUMMARY OF THE INVENTION

In view of the problems mentioned above, it is an object of the present invention to provide a spectrometer slit switching mechanism that generates relatively little heat and which enables a spectrometer to be designed with a flexible arrangement of elements. It is another object of the present invention to provide a spectrometer slit switching mechanism that makes it possible to design small-sized spectrometers.

In order to achieve these objects, the spectrometer slit switching mechanism of the present invention comprises a slit plate having a plurality of entrance slits and exit slits formed at prescribed positions, one or more support rods for supporting the slit plate so as to be movable along the support rods, a screw portion formed on at least one support rod for transmitting force to the slit plate, and a driving motor for transmitting rotational energy to the support rod provided with the screw portion. Furthermore, the entrance slits are arranged on a line that runs parallel to the direction of movement of the slit plate and the exit slits are arranged on a line that is both parallel to and spaced a prescribed distance from the line on which the entrance slits are arranged.

In the slit switching mechanism described above, the driving motor is operated in the clockwise and counterclockwise directions to raise and lower the slit plate in order to align a desired entrance slit and exit slit with the light path of the spectrometer. In this connection after the desired slits have been positioned and the driving motor is stopped, the slit plate is prevented from moving downwards by the engagement of the slit plate with the screw portion of the support rod. Furthermore, since the slits are provided on lines that run parallel to the direction of motion of the slit plate along the support rods, all the elements of the slit switching mechanism can be made extremely thin, and this makes it possible to reduce the size of the spectrometer installed with the slit switching mechanism according to the present invention.

DETAILED DESCRIPTION OF THE PREFERRED EMBODIMENTS

Now, with reference to the appended drawings, a detailed description will be given below for a spectrometer slit switching mechanism according to the present invention.

Figure 1:
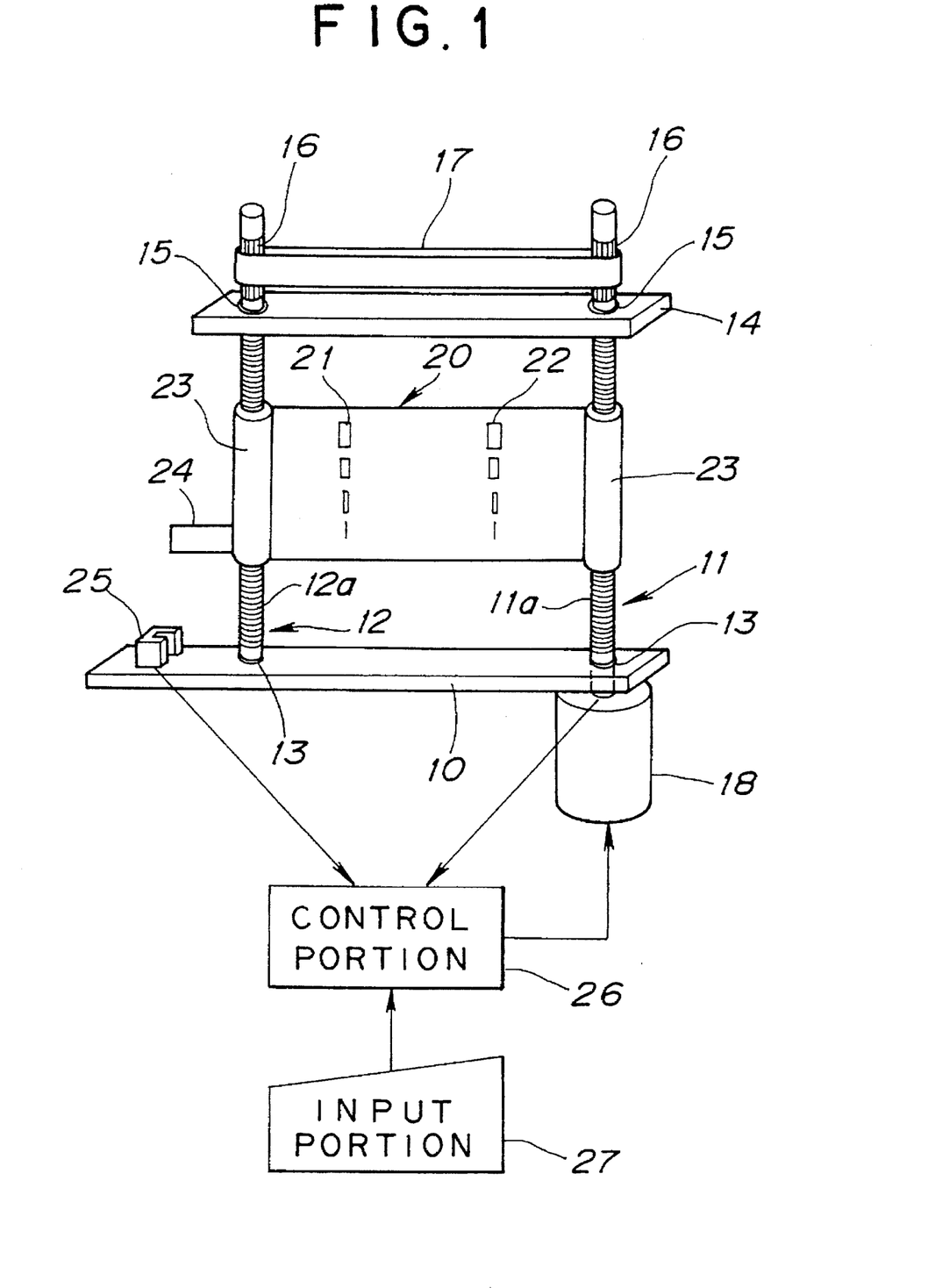
FIG. 1 is a perspective view of a first embodiment of a slit switching mechanism according to the present invention.
Figure 2:
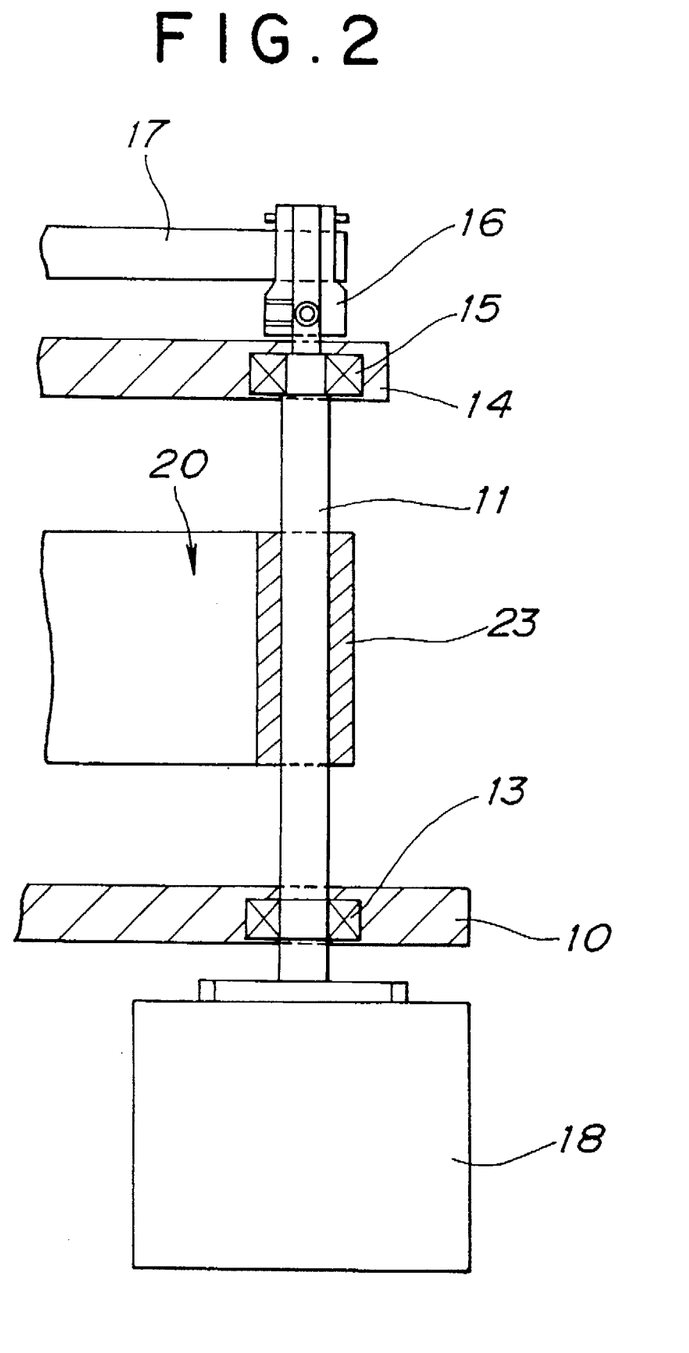
FIG. 2 is a cross-sectional view of a portion of the slit switching mechanism shown in FIG. 1.

FIGS. 1 and 2 illustrate a first embodiment of a spectrometer slit switching mechanism according to the present invention. As shown in FIGS. 1 and 2, a pair of support rods 11, 12 having the same diameter are provided at opposite end portions of a thin, long, flat base plate 10 so as to stand erect from the top surface thereof. And to enable the support rods 11, 12 to be freely rotatable with respect to the base plate 10, the support rods 11, 12 are fitted to bearings 13, 13 provided at fixed positions in the base plate 10.

Furthermore, formed on the outside surface of a middle portion of the support rods 11, 12 are spiral-shaped screw portions 11a, 12a having the same pitch. As for the upper portions of the support rods 11, 12, they pass through bearings 15, 15 provided at fixed positions in a connection plate 14 and extend above the top surface of the connection plate 14. In this arrangement, the bearings 15, 15 form passages that pass from the bottom surface of the connection plate 14 out through the top surface of the connection plate 14, and the connection plate 14 is arranged above the base plate 10 so as to be parallel thereto.

As for the spacing of the bearings 15, 15 provided in the connection plate 14, it is set to be the same as the spacing of the bearings 13, 13 provided in the base plate 10. In this way, the support rods 11, 12 are maintained in upright positions parallel to each other.

Provided at the top end portions of the support rods 11, 12 are flat gear wheels 16, 16 which communicate with each other via a timing belt 17 to enable the support rods 11, 12 to be rotated in the same direction with synchronized speeds of rotation.

Also, in this embodiment, the support rod 11 is integrally connected to an output shaft of a stepping motor 18 so that when the stepping motor 18 is operated in either the clockwise or counterclockwise direction, the support rod 11 is caused to rotate in the same direction as the output shaft of the stepping motor 18, which then transfers rotational force to the support rod 12 via the timing belt 17 to cause the support rod 12 to rotate in the same direction.

Furthermore, a slit plate 20 having a plurality of slits is provided between the support rods 11, 12 so as to be movable up and down in the axial direction thereof. The slits of the slit plate 20 are arranged into a column of entrance slits 21 and a parallel column of exit slits 22, with each column of slits having the same top-to-bottom arrangement of slits of different width so that each entrance slit 21 is matched with a corresponding exit slit 22 at the same vertical position along the slit plate 20 to form a pair of slits having the same width.

For moving the slit plate 20, a pair of movable cylinders 23, 23 are connected to opposite ends of the slit plate 20 and are engaged with the support rods 11, 12. Also, the movable cylinder 23, 23 are engaged with the screw portions 11a, 12a through female screw portions (not shown in the drawings) formed in the inner surface of the movable cylinders 23, 23 for engagement with the screw portions 11a, 12a. In this way, when the support rods 11, 12 are rotated in the clockwise and counterclockwise directions, the movable cylinders 23, 23 are moved up and down, thereby moving the slit plate 20 up and down. In this connection, the amount of movement of the slit plate 20 is set by controlling the extent of angular rotation and the number of revolutions of the stepping motor 18.

Also, formed on the outer surface of one of the movable cylinders 23 is a protrusion 24 used for detecting the base position of the movable cylinder 23, and provided at a fixed position on the upper surface of the base plate 10 is a sensor 25, comprised of a photo-interrupter or the like, for detecting the protrusion 24. These elements are arranged such that when the slit plate 20 is moved down and reaches the base position, the protrusion 24 is detected by the sensor 25.

Furthermore, the output from the sensor 25 and the detection signal from an encoder attached to the output shaft of the stepping motor 18 are sent to a control portion 26. The control portion 26 also receives signals from an input portion 27 instructing the control portion 26 as to what slit number is to be used.

Now, when the control portion 26 receives a slit-selection instruction signal from the input portion 27, namely, when the control portion 26 receives a switching command signal, it first sends a command to the stepping motor 18 causing the stepping motor 18 to rotate in the direction that will cause the slit plate 20 to be lowered. Then, the stepping motor is driven in the same direction of rotation until the control portion 26 receives a detection signal from the sensor 25.

Next, upon receiving a detection signal from the sensor 25, the control portion 26 sends a command to the stepping motor 18 causing it to rotate in the opposite direction. Then, the stepping motor 18 begins to rotate in the direction opposite to that for lowering the slit plate 20, thereby causing the slit plate 20 to be raised. And then by counting the pulses outputted from the encoder while the slit plate 20 is being raised, the control portion determines the distance that the slit plate 20 has been raised, namely the height position of the entrance slits 21 and exit slits 22.

As for controlling the height of the slit plate 20, such control need not be limited to the use of an encoder, but instead may be carried out using various other control techniques, one example being an arrangement in which the stepping motor 18 is rotated only a specific number of pulses necessary for moving a desired pair of slits into a prescribed position after the control portion 26 has received a detection signal.

Now, when the spectrometer slit switching mechanism described above is mounted in a spectrometer, the base plate 10 is fixed to the main body of the spectrometer at a prescribed position thereof through the use of screws or the like.

Next, the operation of the above embodiment will be described. First, an instruction signal for selecting a desired slit number is sent from the input portion 27 to the control portion 26. Upon receiving this signal, the control portion 26 sends a command to the stepping motor 18 causing it to begin rotating, whereupon the stepping motor 18 begins rotating in the direction to lower the slit plate 20. Then, the slit plate 20 is lowered as the stepping motor 18 rotates, and when the slit plate 20 reaches the base position, the protrusion 24 passes into the inside of the sensor 25, thereby causing the sensor 25 to output a detection signal. Upon receiving the detection signal, the control portion 26 sends a command to the stepping motor 18 causing it to begin rotating in the opposite direction, whereupon the stepping motor 18 begins rotating in the opposite direction, which in turn causes the slit plate 20 to begin rising. Then, during the raising of the slit plate 20, the control portion 26 calculates the current position of the slit plate 20 by counting the pulses outputted from the encoder attached to the stepping motor 18.

Then, when the specified pair of slits passes into the light path, the rotation of the stepping motor 18 is terminated. At this point, the slit switching operations are completed. In this regard, it should be noted that even though the rotation of the stepping motor 18 is terminated, the stepping motor 18 does not need to be supplied with an excitation current in order to hold the slit plate 20 at the stopping position.

Figure 3:
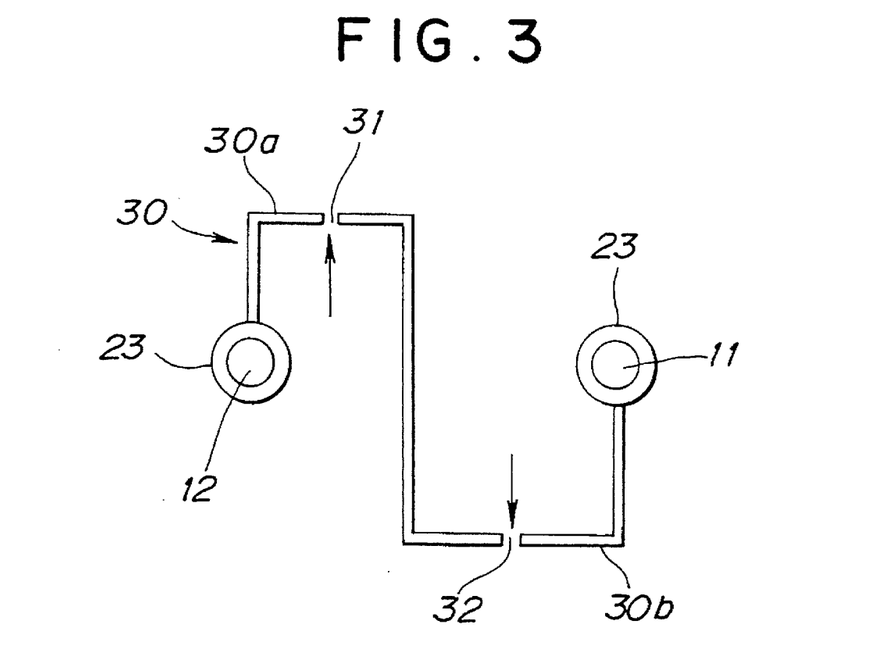
FIG. 3 is a plan view of an essential portion of a second embodiment of a slit switching mechanism according to the present invention.

Now, shown in FIG. 3 is the essential portion of a second embodiment of a slit switching mechanism according to the present invention. In the first embodiment described above, because the slit plate 20 was formed as a flat plate, the focal distance of the incidence light beam must be made to be the same as the focal distance of the exiting light beam in order for images to be formed at the position of each slit. Accordingly, if the focal distances are different, no image will be formed at one of the slits when light is passing through the slit, and this will result in a blurred image.

In this respect, as shown in FIG. 3, a slit plate 30 is bent so as to have a first surface 30a, in which is formed a column of entrance slits 31, and a second surface 30b, in which is formed a column of exit slits 32, with the first and second surfaces 30a and 30b being positioned so as to lie within different planes. Stated more concretely, if the plane in which both the support rods 11, 12 lie is defined as the base plane, the slit plate 30 of the present embodiment, which is connected to the movable cylinders 23 mounted on the support rods 11, 12, is formed with the first surface 30a protruding out of the space between the support rods 11, 12 from one side of the base plane and the second surface 30b protruding out of the space between the support rods 11, 12 from the other side of the base plane. With this arrangement, by adjusting the distance from the base plane to the protruding surfaces 30a and 30b, it is possible to form images with the light beam passing through the slits. In this way, by being able to form images at the position of the slits with the light beam that passes through the slits, the occurrence of blurred images can be avoided, thus making it possible to carry out precise measurements.

Figure 4:
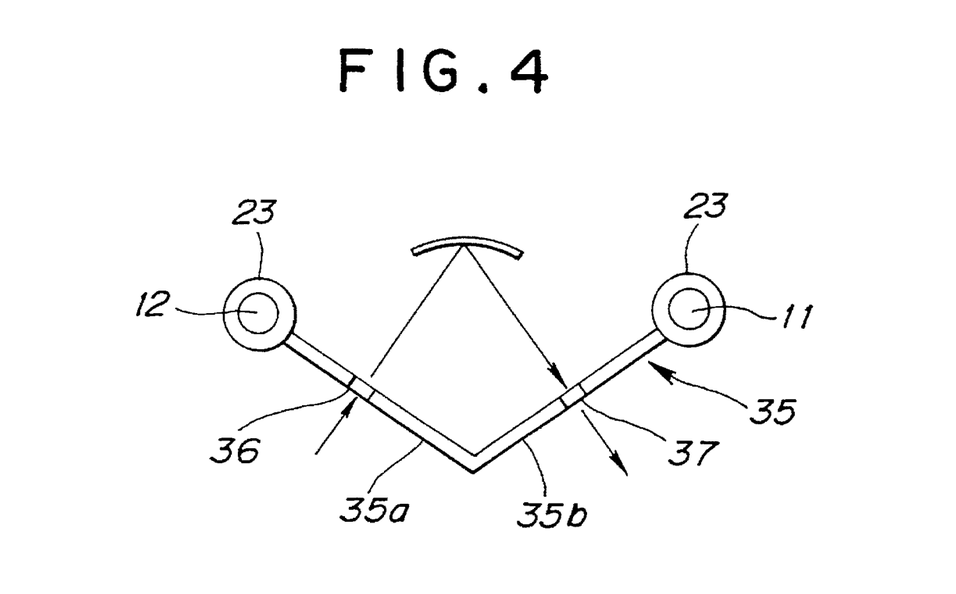
FIG. 4 is a plan view of an essential portion of a third embodiment of a slit switching mechanism according to the present invention.

Now, shown in FIG. 4 is the essential portion of a third embodiment of a slit switching mechanism according to the present invention. In the first and second embodiments above, the entrance slits 21, 31 and the exit slits 22, 32 are formed either in the same surface or in surfaces that are arranged parallel to each other. Accordingly, the optical system must be arranged to allow the path of the light beam that passes through an entrance slit to be parallel with the path of the light beam that passes through the corresponding exit slit. In this regard, if the incidence beam strikes the slit at an angle, the effective width of the slit becomes narrow, and this can give rise to measurement errors. And when the slit switching mechanism is made small for use in small-sized spectrometers, such changes in the effective slit width cannot be ignored. Moreover, when a concave mirror or the like is used to reflect the light beam passing through the entrance slit directly out the exit slit, it is difficult for the incidence beam and the exiting beam to be aligned parallel to each other.

Therefore, in the third embodiment a slit plate 35 is bent in the middle at a prescribed position in order to form a first surface 35a having a column of entrance slits 36 and a second surface 35b having a column of exit slits 37, such that the surfaces 35a and 35b intersect each other at a prescribed angle. Furthermore, the angle formed by the surfaces 35a, 35b is such that the incidence angle of the light beams passing through the slits 36, 37 is zero. In this way, by making the effective width of the slit be the same as the actual width of the slit, errors associated with the slit portions can be eliminated, and this makes it possible for more accurate measurements to be carried out. Moreover, this makes it possible for the optical system of the spectrometer to have a more flexible arrangement of elements.

Figure 5:
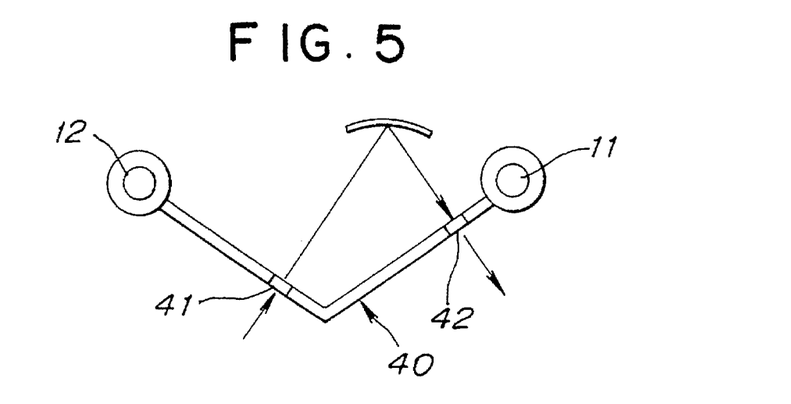
FIG. 5 is a plan view of an example of an alternate essential portion for the third embodiment of a slit switching mechanism according to the present invention.

Furthermore, the slit plate may have slits formed in different positions in order to form images on the slit, in the same manner as that described in the second embodiment above, when the light beams have different focal distances. An example of such arrangement is shown in FIG. 5, in which a column of entrance slits 41 and a column of exit slits 42 are formed in a slit plate 40 at positions that are different from those of the slits 36, 37 of the slit plate 35 shown in FIG. 4.

Figure 6:
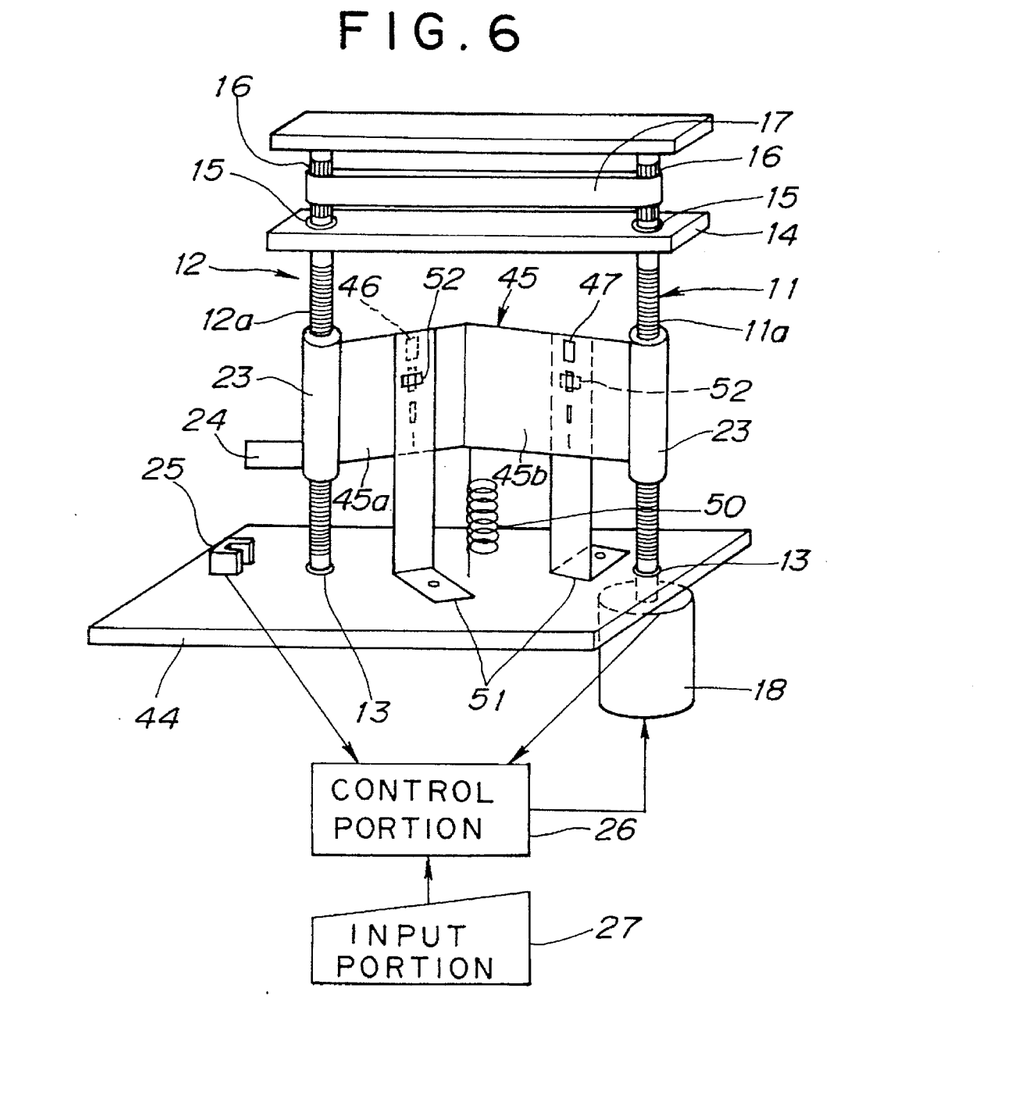
FIG. 6 is a perspective view of a fourth embodiment of a slit switching mechanism according to the present invention.

Now, shown in FIG. 6 is a fourth embodiment of a slit switching mechanism according to the present invention. As shown in FIG. 6, the slit switching mechanism of the fourth embodiment includes the structure of the third embodiment and is an improvement thereof. Namely, the slit switching mechanism of the fourth embodiment has a wide-width base plate 44, support rods 11, 12 having screw portions 11a, 12a provided above the base plate 44, a slit plate 45 that is connected to the support rods 11, 12 through movable cylinders 23, and a stepping motor 18 that can be rotated forwards and in reverse to move the slit plate up and down. Furthermore, in the present embodiment, the slit plate 45 is bent to form a first surface 45a having a column of entrance slits 46 and a second surface 45b having a column of exit slits 47, with the first and second surfaces 45a, 45b intersecting each other at a prescribed angle.

Furthermore, in the present embodiment, in order to bias the slit plate 45 constantly downwards toward the base plate 44, a spring 50 is provided so as to have one end connected to the base plate 44 and the other end connected to the slit plate 45. This makes it possible to reliably suppress any motion in the up and down direction caused, for example, by vibrations in the surrounding environment at the time of measurement or by rattling of the slit plate 45 at the stopping position due to backlash and the like between the female screw portion formed in the movable cylinders 23 and the screw portions 11a, 12a of the support rods 11, 12.

In addition to the elements described above, two erect plates 51 of fixed height are provided at prescribed positions on the upper surface of the base plate 44 so as to follow along the entrance slits 46 and the exit slits 47 of the slit plate 45. Furthermore, each of the erect plates 51 is provided with a fixed slit 52 at a prescribed height that allows the fixed slit 52 to lie within the fixed light path of the spectrograph. And as shown in the enlarged view of FIG. 7, the fixed slits 52 have a prescribed vertical spacing "h" and a width that is greater than the width of any of the slits 46, 47. In this connection, the vertical spacing "H" of the slits 46, 47 is made to be greater than the vertical spacing "h" of the fixed slits 52 by a prescribed margin.

Figure 7:
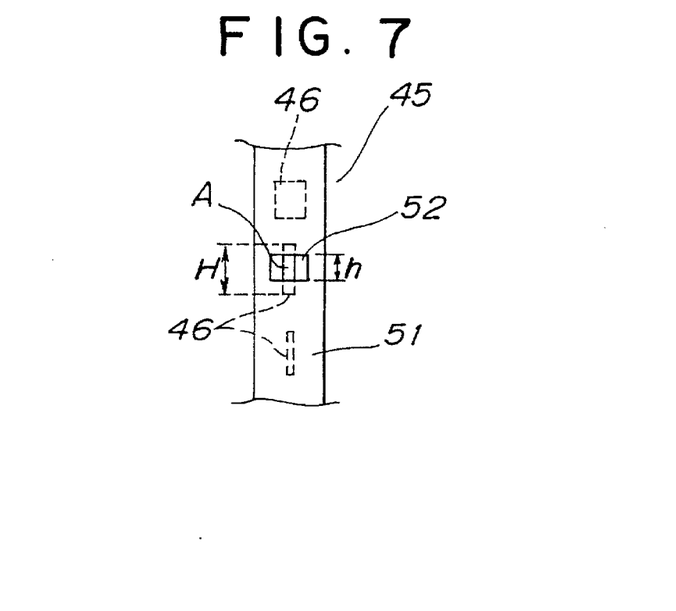
FIG. 7 is an enlarged view of an essential portion of the fourth embodiment of a slit switching mechanism according to the present invention.

According to the above structure, and as shown in FIG. 7 for the case of an entrance slit 46, when an entrance slit 46 or an exit slit 47 is aligned with its respective fixed slit 52, a slit portion "A" is formed having a vertical spacing "h" defined by the fixed slit 52 and a width defined by the width of the entrance slit 46 or the exit slit 47. Consequently, even in the case where a relatively rough control of the stopping position of the slit plate 45 is carried out, it is possible to assure that the slit portion "A" is formed at the desired position. Therefore, even in the case where a simple control system is being utilized, it is possible to carry out highly accurate positioning of the slits, which in turn assures highly accurate measurements with the spectrometer. In the embodiments described above, similar elements are indicated by like reference numerals, and since the function of these elements are the same, no further description will be given.

In each of the embodiments above, the slit plate is supported by two support rods, with each support rod having a screw portion formed thereon. However, the present invention is by no means limited to such structure, and it is possible, for example, to form one of the support rods as a guiding support rod without the provision of a screw portion.

Figure 8:
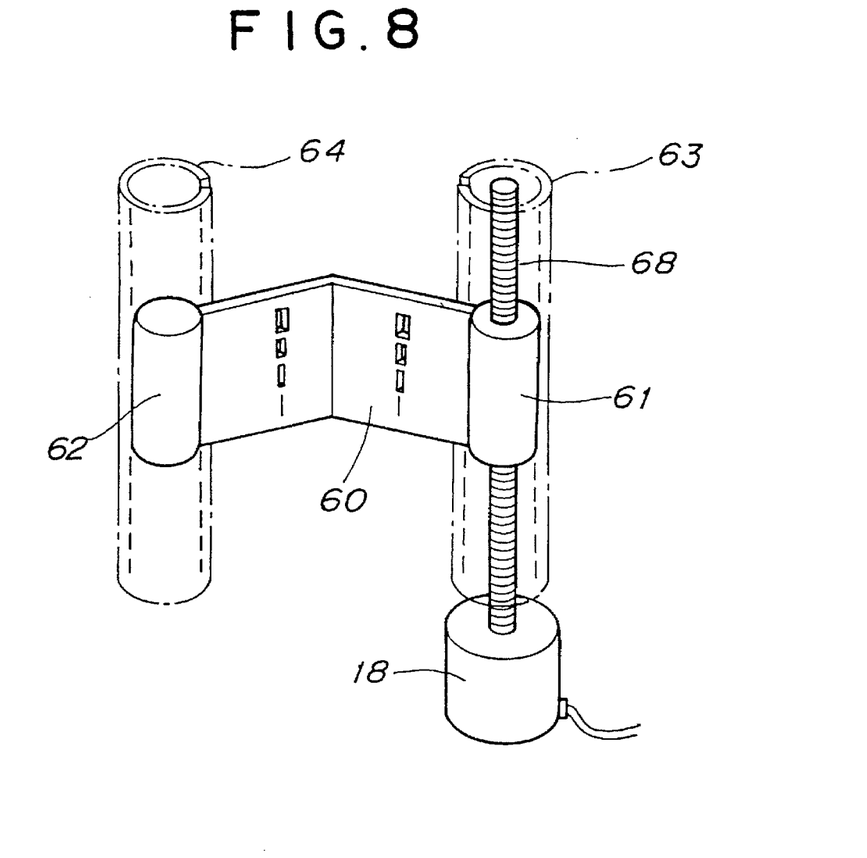
FIG. 8 is a perspective view of a fifth embodiment of a slit switching mechanism according to the present invention.

This type of structure is illustrated by the fifth embodiment shown in FIG. 8, in which a slit plate 60 is connected at opposite ends to end portions 61, 62 which are supported inside tube-shaped supports 63, 64, respectively, so as to be slidable therein. The end portion 63 is also engaged with a screw rod 68 provided inside the tube-shaped support 63, and the screw rod 68 is connected to a motor 18. Accordingly, by operating the motor 18 in the clockwise and counterclockwise directions, the end portion 61 is caused to move up and down, which thereby causes the slit plate 60 to move up and down.

The advantage of this embodiment is that it allows the slit switching mechanism to be manufactured at a lower cost, because the elements 14 through 17 shown in FIGS. 1 and 6 are no longer necessary.

Now, it is also to be understood that even though the present invention was described above as having two support rods or two tube-shaped supports, the present invention is by no means limited to this structure and may, for example, have either just one support rod or tube-shaped support or three or more support rods or tube-shaped supports.

Moreover, even though the slit plate of the present invention was described above as being movable in the vertical direction, the present invention is by no means limited to such arrangement and may, for example, being constructed so as to move a slit plate in the horizontal direction instead.

Now, when using any of the spectrometer slit switching mechanisms described above for the present invention, it is possible to position an entrance slit and a exit slit, both having a prescribed slit width, into a prescribed position for alignment with the light path by operating the driving motor in the clockwise and counterclockwise directions to raise and lower the slit plate. And since the slit plate can be made extremely thin, any of the above slit switching mechanisms can be adapted for installation in small-sized spectrometers. Moreover, in the case where a large number of slits are positioned on the slit plate, the height of the slit plate can be increased without having to change the thickness of the spectrometer. In this connection, since it is important to suppress the thickness of spectrometers, which generally have a planar arrangement of elements and a margin of space at the top and bottom, the slit switching mechanism of the present invention is particularly suited for use in small-sized spectrometers.

Furthermore, when the driving motor is stopped, the slit plate is prevented from sliding down by the engagement with the screw portion provided on the support rods. Therefore, it is not necessary to supply an excitation current to the motor when carrying out measurements, and this makes it possible to suppress the generation of heat. As a result, it is not necessary to provide a space and a mechanism for dissipating heat. Moreover, specimens and sensors can be arranged in the vicinity of the slit switching mechanism, even if such elements are sensitive to heat. Thus, the slit switching mechanism of the present invention makes it possible to plan a more flexible arrangement of elements for even small-sized spectrometers.

While the preferred embodiments of the invention has been described, such description is for illustrative purpose only, and it is to be understood that changes and variations may be made without departing from the sprit or scope of the following claims.

What is claimed is:

1. A slit switching mechanism for use in a spectrometer having a light beam that follows a prescribed light path, comprising:

a slit plate having a plurality of entrance slits and exit slits provided therein at predetermined positions;

at least one support rod for supporting the slit plate, the slit plate being movable along the at least one support rod;

a screw portion formed on the at least one support rod for transmitting a translational direction movement to the slit plate; and a driving motor engaging the at least one support rod along said screw portion so as to provide rotational movement of said at least one support rod;

wherein the entrance slits are arranged on a line that runs parallel to the direction of movement of the slit plate and the exit slits are arranged on a line that is both parallel to and spaced a predetermined distance from the line on which the entrance slits are arranged.

2. The slit switching mechanism of claim 1, wherein the entrance slits are arranged on a first surface of the slit plate and the exit slits are arranged on a second surface of the slit plate.

3. The slit switching mechanism of claim 2, wherein the first surface and the second surface of the slit plate intersect each other at a predetermined angle, such that the light beam passes through each slit in a direction orthogonal to the respective surface of the slit plate.

4. The slit switching mechanism of claim 1, further comprising a pair of slits fixed with respect to said at least one support rod, arranged in the light path of the light beam, having a prescribed vertical spacing, wherein a vertical spacing of the entrance and exit slits of the slit plate as provided so as to be greater than the vertical spacing of the fixed slits so that a plurality of selected slits are formed by the fixed slits and the entrance and exit slits.

5. The slit switching mechanism of claim 2, further comprising a pair of slits fixed with respect to said at least one support rod, arranged in the light path of the light beam, having a prescribed vertical spacing, wherein a vertical spacing of the entrance and exit slits of the slit plate is provided so as to be greater than the vertical spacing of the fixed slits so that a plurality of selected slits are formed by the fixed slits and the entrance and exit slits.

6. The slit switching mechanism of claim 3, further comprising a pair of slits fixed with respect to said at least one support rod, arranged in the light path of the light beam, having a prescribed vertical spacing, wherein a vertical spacing of the entrance and exit slits of the slit plate is provided so as to be greater than the vertical spacing of the fixed slits so that a plurality of selected slits are formed by the fixed slits and the entrance and exit slits.

7. The slit switching mechanism of claim 1, wherein the drive motor has an output shaft that is connected to and aligned substantially colinear with the support rod being supplied with rotational movement from the drive motor.

8. The slit switching mechanism of claim 2, wherein the drive motor has an output shaft that is connected to and aligned substantially colinear with the support rod being supplied with rotational movement from the drive motor.

9. The slit switching mechanism of claim 3, wherein the drive motor has an output shaft that is connected to and aligned substantially colinear with the support rod being supplied with rotational movement from the drive motor.

10. The slit switching mechanism of claim 4, wherein the drive motor has an output shaft that is connected to and aligned substantially colinear with the support rod being supplied with rotational movement from the drive motor.

11. A slit switching mechanism for use in a spectrometer having a light beam that follows a prescribed light path, comprising:

a slit plate having a plurality of entrance slits and exit slits formed at prescribed positions and end portions provided at opposite ends of the slit plate;

parallel tube-shaped supports for supporting the slit plate, in which the end portions of the slit plate are inserted to allow the the slit plate to be slidably movable along the tube-shaped supports; and a support rod provided in at least one tube-shaped support, the support rod having a screw portion formed thereon for transmitting force to one of the end portions of the slit plate; and a driving motor for transmitting rotational energy to the support rod;

wherein the entrance slits are arranged on a line that runs parallel to the direction of movement of the slit plate and the exit slits are arranged on a line that is both parallel to and spaced a prescribed distance from the line on which the entrance slits are arranged.

12. In a spectrometer comprising a light path and a slit plate movable in a prescribed line of motion and provided with a plurality of entrance slits arranged on a line that runs parallel to the line of motion of the slit plate and a plurality of the exit slits arranged on a line that is both parallel to and spaced a prescribed distance from the line on which the entrance slits are arranged, with each entrance slit having a corresponding exit slit, a method of positioning an entrance slit and its corresponding exit slit, comprising the steps of:

moving the slit plate along its line of motion; and stopping the motion of the slit plate when the entrance slit and its corresponding exit slit become aligned with the light path.

13. The positioning method of claim 12 further comprising the step of providing the slit plate, wherein the slit plate is bent to form a first planar surface provided with the entrance slits and a second planar surface provided with the exit slits.

* * * * *